3,271,426
NOVEL ANDROSTANE OXIMINO ETHERS AND
METHODS FOR THEIR MANUFACTURE
Frank J. Villani, West Caldwell, N.J., assignor to Schering
Corporation, Bloomfield, N.J., a corporation of New
Jersey
No Drawing. Filed June 28, 1963, Ser. No. 291,262
9 Claims. (Cl. 260—397.5)

This invention relates to oximino ethers of androstanes which are therapeutically active, to pharmaceutical compositions thereof, and to methods for their manufacture including novel intermediates produced thereby.

My invention provides for tertiary-aminoalkoximino ethers of steroids of the androstane series which may be depicted as follows:

$$B = NOZA \qquad (I)$$

wherein B is a saturated or unsaturated androstane attached to the nitrogen of the oximino function through an exocyclic double bond at positions such as at C–3 and/or C–17 and at C–11; Z is a lower alkylene having preferably from 2 to 5 carbon atoms; and A is a tertiary amine, preferably a di-lower alkylamino group and its salts and quaternary lower alkyl ammonium salts. Also included within the definition of A are other tertiary-amine derivatives such as a lower alkylene imino group (e.g., piperidino), a lower oxa-alkylene imino group (e.g., morpholino), a lower aza-alkylene imino group (e.g., N-methylpiperazino), and other heterocyclic functions including salts and quaternary ammonium compounds thereof, especially lower alkyl ammonium salts. The heterocyclic radicals may be substituted or unsubstituted in any desired manner.

Among the alkylene bridge groups, Z, contemplated in the oximino ether function such as at C–3 and/or C–17 of a steroid of the androstane series are straight-chained and branched hydrocarbon radicals having preferably 2 to 5 carbon atoms including ethylene, propylene, methylethylene, butylene, methylpropylene, dimethylethylene, pentylene, and the like.

Included among the preferred di-lower alkylamino functions, A (having preferably up to 4 carbon atoms) are such as dimethylamino, diethylamino, dipropylamino, methyl-ethylamino, methyl-propylamino, dibutylamino, and the like. Also included within the definition of di-lower alkylamino are substituted alkyl-alkylamino groups, in particular, benzyl-lower alkylamino groups such as benzyl-methylamino, benzyl-ethylamino, benzyl-propylamino, and the like.

The benzyl-lower alkylaminoalkylene oximino androstane derivatives are particularly valuable as intermediates, since upon reaction with palladium on charcoal in ethanol utilizing known techniques, the benzyl group is reductively cleaved and there is formed the corresponding mono-lower alkylaminoalkylene oximino androstane.

Preferred embodiments of my invention are 3- and/or 17-dialkylaminoalkoximino ether derivatives of saturated androstanes such as those defined by the following Formula II:

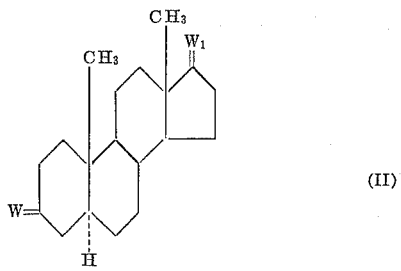

(II)

and the non-toxic, pharmaceutically acceptable acid addition and quaternary ammonium salts thereof; wherein W is a member selected from the group consisting of di-lower alkylaminoalkoximino (e.g., NOZA as defined hereinabove), keto,

and
R being a member selected from the group consisting of hydrogen and an acyl radical of a hydrocarbon carboxylic acid having up to 8 carbon atoms; $W_1$ is a member selected from the group consisting of di-lower alkylaminoalkoximino, and

R being as defined hereinabove; and at least one of W and $W_1$ being di-lower alkylaminoalkoximino.

Illustrative of the carboxylic acid esters contemplated at C–3 and at C–17 are lower alkanoates such as acetate, propionate, butyrate, valerate, caproate, and t-butyl acetate; aroyl esters such as benzoate and toluate; and esters from dibasic organic acids such as succinate, phthalate, and sulfobenzoate. Also included in the term "acid radical" are the alkali metal salts of the dibasic carboxylic acid esters.

Illustrative of the acid salts and anions of the quaternary salts contemplated are those of inorganic or organic acids such as hydrohalic acids (e.g., hydrochloric, hydrobromic, and hydroiodic acid), sulfuric acid, nitric acid, phosphoric acids, perchloric acid, alkylsulfonic acids (e.g., methane or ethane sulfonic acid), benzenesulfonic acids (e.g., p-toluenesulfonic acid), naphthalenesulfonic acids, oxalic acid, tartaric acid, citric acid, lactic acid, maleic acid, benzoic acid, salicyclic acid, p-amnosalicyclic acid, acetyl salicyclic acid, amino acids, or alkyl sulfuric acids, such as methyl sulfuric acid.

Particularly valuable among the saturated androstane oximino ethers of Formula II are 17-($\beta$-dimethylaminoethoximino)-androstane-3$\alpha$-ol,
17-($\beta$-diethylaminoethoximino)-androstane-3$\alpha$-ol,
17-($\beta$-dimethylaminoethoximino)-androstane-3$\beta$-ol, and the hydrochloride and methiodide salts thereof as well as 3,17-bis-($\beta$-dimethylaminoethoximino)-androstane,
3-($\beta$-dimethylaminoethoximino)-androstane-17$\beta$-ol,
17-($\beta$-dimethylaminoethoximino)-androstane-3-one,
17-($\beta$-methyl-benzylaminoethoximino)-androstane-3$\alpha$-ol, and the acid addition and lower alkyl halide quaternary salts thereof.

Typical embodiments of the 3- and/or 17-di-lower alkyl-aminoalkoximino unsaturated androstane ethers of my invention are 3$\beta$-hydroxy-17-dialkylaminoalkoximino-5-androstene such as defined by following Formula III, and the 3- and/or 17-di-alkylaminoalkoximino androstanes as defined by the following structural Formula IV:

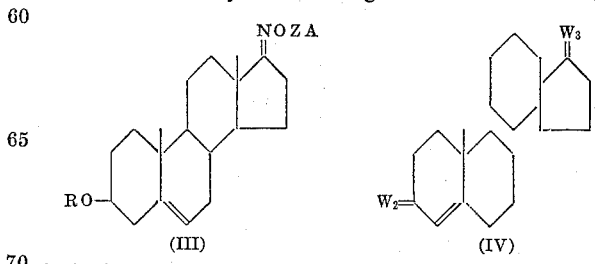

including the non-toxic, pharmaceutically acceptable acid addition and quaternary alkylammonium halide salts thereof; wherein R, Z, and A are as defined for Formulae I and II; and $W_2$ is a member selected from the group consisting of keto, and di-lower alkylaminoalkoximino (i.e., NOZA as heretofore defined); and $W_3$ is a member selected from the group consisting of keto, di-alkylaminoalkoximino and

wherein R' is a member selected from the group consisting of hydrogen and an acyl radical of a hydrocarbon carboxylic acid having up to 8 carbon atoms and B is a member selected from the group consisting of hydrogen, lower alkyl and ethinyl; and at least one of $W_2$ and $W_3$ being a di-lower alkylaminoalkoximino.

Typical 3β - hydroxy - 17 - dialklylaminoalkoximino-5-androstene of Formula III are 3β-acetoxy-17-(β-dimethylaminoethoximino)-5-androstene hydrochloride,
17-(β-dimethylaminoethoximino)-5-androstene-3β-ol, and
17-(β-methyl-benzylaminoethoximino)-5-androstene-3β-ol.

Valuable 4-androstene-di-lower alklylaminoalkoximino ethers of Formula IV are such as 3-(β-dimethylaminoethoximino)-4-androstene-17-one,
17-(β-dimethylaminoethoximino)-4-androstene-3-one,
3,17-bis-(β-dimethylaminoethoximino)-4-androstene,
3-(β-dimethylaminoethoximino)-4-androstene-17β-ol,
3-(β-dimethylaminoethoximino)-17α-methyl-4-androstene-17β-ol,
3-(β-dimethylaminoethoximino)-17α-ethinyl-4-androstene-17β-ol,
3-(β-benzyl-methylaminoethoximino)-4-androstene-17β-ol, and the hydrochloride and methiodide salts thereof.

The above definition of the preferred compounds of Formulae II, III, and IV should be considered to admit the presence of other substituents on the steroid nucleus, particularly at positions 1-, 6-, and 16-, such as the 1-methyl-, 6α-methyl-, 6α-fluoro-, 6α-chloro-, 16α-methyl-, and 16β-methyl-analogs thereof; and particularly at the 9- and 11-positions, e.g., 9,11-halohydrins and esters thereof such as 9α-fluoro-11β-hydroxy-, 9α-chloro-11β-hydroxy-, 9α-bromo-11β-hydroxy-, and the 11-formate and 11-acetate thereof, 9α,11β-dihalogeno derivatives such as 9α,11β-dichloro-, 9α-chloro-11β-fluoro-, 9α-bromo-11β-chloro-, 9α-bromo-11β-fluoro, 11-keto and 9α-halogeno-11-keto derivatives.

Also considered within my inventive concept are 1-dehydro-analogs, particularly of the compounds of Formulae III and IV, such as 17-(β-dialkylaminoethoximino)-1,5-androstadiene-3β-ol and 3-(β-dialkylaminoethoximino)-1,4-androstadiene-17β-ol, as well as 19-nor analogs of Formulae II, III, and IV, particularly the 19-nor-4-androstenes of Formula IV, and specifically the 3-(di-lower alkylaminoalkoximino)-17α-ethinyl - 19-nor-4-androstene-17β-ols.

Additionally, as stated heretofore, although the preferred embodiment of my invention is to the dialkylaminoalkoximino ethers such as defined by Formulae I–IV, also included within my invention and considered as equivalent to the above-described dialkylaminoalkoximino ethers are those wherein the tertiary-amino function (A) is a nitrogen-containing heterocyclic radical such as piperidino, pyrrolidino, N-methylpiperazino, wherein the heterocyclic radicals may be substituted or unsubstituted in any desired manner.

The 3- and/or 17-tertiary-aminoalkoximino androstanes of my invention are conveniently derived from the corresponding ketone derivative of an androstane, preferably devoid of ketone functions elsewhere in the steroid molecule, e.g., androstane-3α-ol-17-one, by reaction with a member of the group consisting of an O-alkylhydroxylamine substituted in the alkyl group by a tertiary-amine (preferably by a di-lower alkylamino group), an acid salt of said O-tertiary-amine substituted alkylhydroxylamine, or an O-alkylhydroxylamine substituted in the alkyl group by a radical convertible to a tertiary-amine.

Exemplary of a radical convertible to a tertiary-amine is a halide, a free hydroxyl group, or a reactively esterified hydroxyl group, particularly a sulfonyloxy group. Conversion of these radicals into an amino group is effected utilizing procedures similar to those known in the art, e.g., a radical containing a hydroxyl group is halogenated with thionyl chloride or esterified with p-toluenesulfonic acid, for example, and the resultant halide or reactive ester, e.g., the p-toluenesulfonyloxy derivative, is reacted with ammonia or an amine, e.g., a secondary amine such as diethylamine.

In a preferred mode of preparing a novel compound of my invention, e.g., 17-(β-dimethylaminoethoximino)-androstane-3α-ol, an ethanolic solution of androstane-3α-ol-17-one is heated under reflux for about 4 hours with 1.1 molar equivalents of O-dimethylaminoethylhydroxylamine dihydrochloride in the presence of pyridine. After removal of the solvents in vacuo, isolation of the oximino ether free base from the resultant mixture of acid salts is effected by treatment with a mild base, e.g., sodium bicarbonate, whereby is obtained 17-(β-dimethylaminoethoximino)-5-androstane-3α-ol.

Alternatively, by substituting the free base of the hydroxylamine reagent, e.g., O-dimethylaminoethylhydroxylamine, for the hydrochloride salt thereof as in the above-described procedure, there is obtained directly the oximino ether free base, e.g., 17-(β-dimethylaminoethoximino)-5-androstane-3α-ol.

By utilizing other O-dialkylaminoalkylhydroxylamines in this process there is obtained the corresponding oximino ether. For example, reaction of androstane-3α-ol-17-one with O-diethylaminopentylhydroxylamine and O-dimethylaminopropylhydroxylamine, respectively, will yield 17-(ω-diethylaminopentoximino)-androstane-3α-ol and 17-(γ-dimethylaminopropoximino)-androstane-3α-ol, respectively.

My process whereby a 3- and/or 17-keto androstane is reacted with a tertiary-aminoalkoxamine (e.g., an O-tertiary-amine substituted alkylhydroxylamine) or acid salt thereof, is the process of choice when it is desired to prepare an oximino ether of an androstane having but one oximino ether function present in the molecule, for example, the compounds of Formula III and those compounds of Formulae II and IV wherein but one of W and $W_1$ or of $W_2$ and $W_3$, respectively, is a dialkylaminoalkoximino group. When preparing a mono-tertiary-aminoalkoximino derivative of an androstane having more than one reactive ketone group, e.g., 4-androstene-3,17-dione, it is desirable, prior to reaction with O-substituted alkylhydroxylamine, to block one of the ketone functions by preparation of non-reactive derivatives thereof, e.g., cyclic ketals, enol-ethers, eneamines, and the like. Thus, for example, 4-androstene-3,17-dione, upon reaction with ethylene glycol in the presence of p-toluenesulfonic acid, will yield either the 3-ethylene ketal derivative or the 17-ethylene ketal derivative depending on the catalyst-steroid ratio used. Reaction of the 3-ethylenedioxy-4-androstene-17-one and the 17-ethylenedioxy-4-androstene-3-one thereby formed with O-dimethylaminoethylhydroxylamine followed by hydrolysis of the 3- and 17-ketal groups in the respective products formed will yield 17-(β-dimethylaminoethoximino)-4-androstene-3-one and 3-(β-dimethylaminoethoximino)-4-androstene-17-one, respectively, both of which are compounds of Formula IV wherein one of $W_2$ and $W_3$ is keto and the other is a tertiary-aminoalkoximino derivative.

In the case of a polyketonic androstane having an 11-keto group, e.g., 16α-methyl-4-androstene-17β-ol-3,11-dione, by using approximately but one molar equivalent of the tertiary-aminoalkoxamine reagent, e.g., O-dimethylaminopropylhydroxylamine, there will be obtained as the major product the 3-oximino ether, e.g., 3-(β-dimethyl-aminoethoximino)-16α-methyl - 4 - androstene-17β-ol-11-one, a 11-keto-16α-methyl derivative of a compound of Formula IV wherein $W_3$ is

and $W_2$ is dialkylaminoalkoximino. As a general rule, in this process even when but one ketone group is present in the molecule, I have found it preferable to use but a slight molar excess of reagent (e.g., 1.1 moles of O-dialkyl-aminoalkylhydroxylamine) to each mole of keto androstane used.

The O-dialkylaminoalkylhydroxylamines (e.g., dialkyl-aminoalkoximines) are known and prepared according to procedures well known in the art. For example, O-dimethylaminoethylhydroxylamine (dimethylaminoethox-amine) is conveniently prepared by reaction of (β-chloro-ethyl)-dimethylamine hydrochloride with the sodium salt of acetone oxime followed by treatment of the O-(β-di-methylaminoethyl)-acetone oxime thereby formed with aqueous hydrochloric acid.

The acid addition salts of the tertiary-aminoalkoximino androstane derivatives of my invention are preferably prepared from the corresponding free base utilizing known techniques, e.g., by adding an anhydrous alkanol solution of the desired acid, such as those mentioned hereinabove, e.g., hydrochloric, maleic, or tartaric acid, to a solution of the free base in an inert solvent preferably one in which the acid salt is insoluble, e.g., ethereal solutions of 17-(β-dimethylaminoethoximino)-androstane-3α-ol,
17-(β-dimethylaminoethoximino)-5-androstene-3β-ol,
3-(β-dimethylaminoethoximino)-4-androstene-17β-ol whereby is obtained their respective hydrochloride, maleate and tartrate salts.

The quaternary ammonium salts of this invention are prepared in known manner by treating the tertiary-amino-alkoximino androstane free base with a quaternating agent, especially a reactive ester of a lower alkanol, such as an alkyl halide, e.g., methyl iodide, a sulfuric acid alkyl ester, or a benzenesulfonic acid alkyl ester, such as p-toluenesulfonic acid alkyl ester. Thus, for example, treatment of 17-(β-dimethylaminoethoximino)-androstane-3α-ol,
17-(β-dimethylaminoethoximino)-5-androstene-3β-ol, and
3-(β-dimethylaminoethoximino)-4-androstene-17β-ol with methyl iodide, dimethyl sulfate and methyl-p-toluenesulfonate respectively, will yield:

17-(β-trimethylammoniumethoximino)-androstane-3α-ol iodide,
17-(β-trimethylammoniumethoximino)-androstane-3α-ol methylsulfate,
17-(β-trimethylammoniumethoximino)-androstane-3α-ol p-toluenesulfonate,
17-(β-trimethylammoniumethoximino)-5-androstene-3β-ol iodide,
17-(β-trimethylammoniumethoximino)-5-androstene-3β-ol methylsulfate,
17-(β-trimethylammoniumethoximino)-5-androstene-3β-ol p-toluenesulfonate,
3-(β-trimethylammoniumthoximino)-4-androstene-17β-ol iodide,
3-(β-trimethylammoniumethoximino)-4-androstene-17β-ol methylsulfate, and
3-(β-trimethylammoniumethoximino)-4-androstene-17β-ol p-toluenesulfonate, respectively.

An alternate method of obtaining my androstane oximino ethers such as defined by Formulae II, III, and IV consists in first converting a keto function to the corresponding oxime by known methods such as with hydroxylamine hydrochloride in the presence of a base such as pyridine or sodium hydroxide. The tertiary-aminoalkyl radical is then introduced into the oximino androstane derivative by reaction preferably with a chloride of an alkyl-tertiary-amine or a radical convertible into such a group and, if desired, in the form of their salts. In those resulting androstane oximino derivatives containing a radical convertible into an amino group, said radical is so converted utilizing this alternate procedure.

This alternative procedure whereby a 3- and/or 17-keto androstane derivative, after conversion to the corresponding 3- and/or 17-oximino androstane is reacted with a tertiary-aminoalkyl halide to obtain a 3- and/or 17-oximino ether of Formulae I–IV, is the preferred process when preparing an androstane derivative containing more than one oximino function. Thus, androstane-3,17-dione, 4-androstene-3,17-dione, and 11-keto-testosterone upon reaction with hydroxylamine hydrochloride yields 3,17-bis - oximino androstane, 3,17-bis-oximino-4-androstene, and 3,11 - bis-oximino-4-androstene-17β-ol, respectively, which upon reaction with about 2 moles of β-dimethyl-aminoethyl chloride will yield 3,17-bis-(β-dimethylamino-ethoximino)-androstane, 3,17-bis-(β-dimethylaminoethox-imino)-4-androstene, and 3,11-bis-(β-dimethylaminoeth-oximino)-4-androstene-17β-ol, the first two of which are compounds of Formulae II and IV, respectively, wherein W and $W_1$, $W_2$ and $W_3$ are dialkylaminoethoximino (i.e., NOZA of Formula I), the last being an equivalent derivative of a compound of Formula IV wherein $W_2$ is a dialkylaminoalkoximino (NOZA), $W_3$ is

and there is an additional dialkylaminoalkoximino function at C–11.

In general, when preparing my novel 17-tertiary-amino-alkoximino androstanes it is preferable to have all the desired substituents present in the steroid molecule prior to reaction with the O-tertiary-aminoalkylhydroxylamine reagent or hydroxylamine depending upon which process is contemplated. Thus, when preparing a 3- and/or 17-lower alkanoate, e.g., 3-acetate, of an androstane oximino ether derivative such as 17-(β-dimethylaminoethoximino)-androstane-3α-ol,
17-(β-dimethylaminoethoximino)-5-androstene-3β-ol, and
3-(β-dimethylaminoethoximino)-4-androstene-17β-ol, the preferred starting compounds are 3α-acetoxyandros-tane-17-one, 3β-acetoxy-5-androstene-17-one, and testosterone acetate. Alternatively, the ester derivatives, e.g., 3-acetate and 3-propionate are prepared from the corresponding hydroxy derivatives, e.g., 17-(β-dimethylamino-ethoximino)-androstane-3α-ol, by reaction with a lower alkanoic acid anhydride, e.g., acetic anhydride and propionic anhydride, in pyridine.

When it is desired to prepare an androstane oximino ether derivative of which the corresponding starting keto androstane derivative is not available or which is prepared in but poor yields, the desired androstane oximino ether may be derived from other androstane oximino ether derivatives by utilizing procedures known in the steroid art. Thus, 3-(β-dimethylaminoethoximino)-an-drostane-17-one is conveniently derived from androstane-17β-ol-3-one by reaction with O-dimethylaminoethylhy-droxylamine hydrochloride according to the process of this invention whereby is prepared the 17β-hydroxy derivative, 3-(β-dimethylaminoethoximino)-androstane-17β-ol, which when subjected to an Oppenauer oxidation utilizing aluminum iso-propylate and cyclohexanone in toluene is converted to the desired 17-keto-3-oximino ether, 3-(β-dimethylaminoethoximino)-androstane-17-one.

It will be apparent to one skilled in the steroid art that by known procedures there may be introduced, preferably in the starting steroids, or in the final oximino ether androstanes of this invention (such as defined by Formulas II, III, and IV), substituents at C-1 (e.g., methyl), C-6 (e.g., methyl, bromine, fluorine, hydroxyl), C-16 (e.g., methyl, chlorine, fluorine, α-hydroxy), and at 9 and 11 (e.g., 9,11-halohydrins such as 9α-bromo-11β-hydroxy-, 9α-fluoro-11β-hydroxy-, 9β,11β-epoxy-, and 9(11)-dehydro bond, 9α,11β-dihalogeno derivatives such as 9α,11β-dichloro-) and the like.

My androstane oximino ethers such as those defined by Formulae II, III, and IV are surprisingly valuable as anti-androgens and, thus, are useful in countering the effects of androgen-induced conditions or states. The novel androstane oximino ethers of this invention also are hypocholesteremic agents, being valuable as cholesterol lowering agents. Those derivatives defined by Formula IV, and particularly the 19-nor homologs thereof, e.g., 3-(β-dimethylaminoethoximino)-17α-ethinyl-19-nor-4-androstene-17β-ol, are valuable as anti-fertility agents.

My novel 17-(tertiary - aminoalkoximino)-androstane derivatives such as those of Formulae I–IV, their salts or quaternary ammonium compounds or mixtures thereof can be used in the form of pharmaceutical preparations. In formulating these pharmaceutical compositions, a novel compound of this invention, e.g., 17-(β-dimethylaminoethoximino)-5-androstene-3α-ol hydrochloride is usually compounded with an excipient which is edible and chemically inert to the aforenamed oximino ether. Excipients such as lactose, sucrose, starch, pregelatinized starch, gum arabic, gum tragacanth, or mixtures thereof may be used usually in admixture with an additive such as magnesium stearate, talc, cornstarch, or the like.

Oral pharmaceutical composition forms other than tablets may be used. Thus, in general, fine powders or granules of 17-dialkylaminoalkoximino-androstane-3-ols and derivatives thereof such as defined by Formula II, for example, may contain diluents and dispersing and surface active agents and may be presented in a syrup, or in capsules, or cachets in the dry state, or in non-aqueous suspension, when a suspending agent may be included in tablets, when binders and lubricants may be included; or in a suspension in water, or in a syrup or in an oil, or in a water/oil emulsion when flavoring preserving, thickening, emulsifying agents may be included. The granules or tablets may be coated.

The following are examples illustrating my invention. It is to be understood that the invention is not to be limited to the exact details of operation or to the exact showings and descriptions, as obvious modifications and equivalents will be apparent to one skilled in the art. The invention is, therefore, to be limited only by the scope of the appended claims.

PREPARATION A—OXIME REAGENT

*Dimethylaminoethoxyamine dihydrochloride.*—Admix 73 g. acetone-oxime, 1 mole of dimethylaminoethylchloride hydrochloride, 427 g. of anhydrous potassium carbonate and 1.5 l. of benzene. Stir and reflux overnight. Cool, filter, and wash precipitate with hot benzene. Combine filtrates, concentrate to a residue and distill in vacuo to obtain the dimethylaminoethyl ether of acetone-oxime (B.P. 85–88°/50 mm.).

Admix 100 g. of acetone-oxime of the above and 1 liter of 10% aqueous hydrochloric acid. Stir on a steam bath for 15 hours. Concentrate to a residue in vacuo. Recrystallize the residue from methanol ether solvent obtaining dimethylaminoethoxyamine dihydrochloride (O-β-dimethylaminoethylhydroxylamine dihydrochloride). M.P. 181–182.5° C.

By substituting other equivalent tertiary-aminoalkyl chloride hydrochlorides for dimethylaminoethylchloride hydrochloride in the above preparation, the corresponding t-aminoalkoxyamine hydrochlorides are obtainable. Accordingly, there may be prepared by this method oxime reagents exemplified by the following alkoxyamines (it is understood that these reagents are prepared as above and are obtained in the form of their dihydrochloride salts):

dimethylaminopropoxyamine,
dimethylaminobutoxyamine,
diethylaminobutoxyamine,
diethylaminoethoxyamine,
diethylaminopropoxyamine,
diethylaminoisopropoxyamine,
diethylaminopentoxyamine,
benzylmethylaminoethoxyamine,
pyrrolidinoethoxyamine,
pyrrolidinopropoxyamine,
piperidinoethoxyamine,
piperidinopropoxyamine,
morpholinoethoxyamine,
morpholinobutoxyamine,
piperazinoethoxyamine,
N-1-methyl-N-4-piperazinoethoxyamine and
N-1-(hydroxyethyl)-N-4-propoxyamine.

*Example 1.—Mono-(dialkylaminoalkoximino)-androstane derivatives*

A. *17-(β - dimethylaminoethoximino) - androstane-3α-ol.*—Heat at reflux temperature for four hours a solution of 2.9 g. of androstane-3α-ol-17-one, 2 g. of O-β-dimethylaminoethylhydroxylamine dihydrochloride, 10 ml. of pyridine, and 70 ml. of ethanol. Distill the solvents in vacuo on a steam bath, dissolve the resultant white solid residue in water, and add a saturated solution of sodium bicarbonate until the aqueous mixture is alkaline; then extract the aqueous mixture with methylene chloride. Distill the combined methylene chloride extracts on a steam bath and triturate the resultant residue with water. Filter and then air dry the resultant precipitate of 17-(β-dimethylaminoethoximino)-androstane - 3α - ol. Purity by crystallization from hexane. M.P. 110–111.5° C.

In a similar manner, 3α-acetoxyandrostane-17-one is reacted with O-β-dimethylaminoethylhydroxylamine dihydrochloride in the above-described manner to give 3α-acetoxy-17-(β-dimethylaminoethoximino)-androstane.

B. By substituting O-diethylaminoethylhydroxylamine dihydrochloride, O-diethylaminopentylhydroxylamine dihydrochloride, or O-dimethylaminopropylhydroxylamine dihydrochloride for O - β - dimethylaminoethylhydroxylamine dihydrochloride in procedure A there is obtained, respectively, 17-(β-diethylaminoethoximino)-androstane-3α-ol,
17-(ω-diethylaminopentoximino)-androstane-3α-ol and
17-(ω-dimethylaminopropoximino)-androstane-3α-ol.

C. The following compounds are each reacted with O - β - dimethylaminoethylhydroxylamine dihydrochloride in a manner similar to that described in Example 1A:

androstane-3β-ol-17-one
androstane-17β-ol-3-one
androstane-17β-ol-3-one 17-valerate
5-androstene-3β-ol-17-one
5-androstene-3β-ol-17-one 3-acetate
4-androstene-17β-ol-3-one
4-androstene-17β-ol-3-one 17-propionate
17α-methyl-4-androstene-17β-ol-3-one
17α-ethinyl-19-nor-4-androstene-17β-ol-3-one
17α-ethinyl-4-androstene-17β-ol-3-one
1,4-androstadiene-17β-ol-3-one
9α-fluoro-17α-methyl-4-androstene-11β,17β-diol-3-one
16α-methylandrostane-17β-ol-3,11-dione
6α-methyl-9α,11β-dichloroandrostane-17β-ol-3-one
5α-9(11)-androstene-17β-ol-3-one 17-propionate
6β-bromo-9β,11β-oxido-17α-ethinyl-1,4,androstadiene-17β-ol-3-one
6α-fluoro-4-androstene-17β-ol-3-one The resultant respective products are each isolated and purified in a manner similar to that described in Example 1A to give, respectively:

17-(β-dimethylaminoethoximino)-androstane-3β-ol
3-(β-dimethylaminoethoximino)-androstane-17β-ol 3-(β-dimethylaminoethoximino)-androstane-17β-ol
   valerate
17-(β-dimethylaminoethoximino)-5-androstene-3β-ol
17-(β-dimethylaminoethoximino)-5-androstene-3β-ol
   acetate
3-(β-dimethylaminoethoximino)-4-androstene-17β-ol
3-(β-dimethylaminoethoximino)-4-androstene-17β-ol
   propionate
3-(β-dimethylaminoethoximino)-17α-methyl-4-
   androstene-17β-ol
3-(β-dimethylaminoethoximino)-17α-ethinyl-19-nor-4-
   androstene-17β-ol
3-(β-dimethylaminoethoximino)-17α-ethinyl-4-
   androstene-17β-ol
3-(β-dimethylaminoethoximino)-1,4-androstadiene-
   17β-ol
3-(β-dimethylaminoethoximino)-9α-fluoro-17α-methyl-
   4-androstene-11β,17β-diol
3-(β-dimethylaminoethoximino)-16α-methylandrostane-
   17β-ol-11-one
3-(β-dimethylaminoethoximino)-6α-methyl-9α,11β-
   dichloro-androstane-17β-ol
3-(β-dimethylaminoethoximino)-5α-9(11)-androstene-
   17β-ol propionate
3-(β-dimethylaminoethoximino)-6β-bromo-9β,11β-
   oxido-17α-ethinyl-1,4-androstadiene-17β-ol
3-(β-dimethylaminoethoximino)-6α-fluoro-4-androstene-
   17β-ol.

*Example 2.—3,17-bis-(β-dimethylaminoethoximino)-androstane*

A. *3,17-bis-oximino androstane.*—Stir at reflux temperature for four hours a solution of 2.8 g. of androstane-3,17-dione and 1.4 g. of hydroxylamine hydrochloride in 3 ml. of pyridine and 10 ml. of ethanol. Distill the solvent in vacuo and add water to the resultant residue. Filter and air dry the precipitate of substantially 3,17-bis-oximino androstane. Purify by recrystallization from ethanol-water.

In a manner similar to that described above, 4-androstene-3-17-dione, 4-androstene-11β-ol-3,17-dione, and 4-androstene-3,11,17-trione are each reacted with hydroxylamine hyrochloride in pyridine and ethanol and there is obtained, respectively, 3,17-bis-oximino-4-androstene, 3,17-bis-oximino-4-androstene-11β-ol, and 3,11,17-tri-oximino-4-androstene.

B. *3,17-bis-(β-dimethylaminoethoximino)-androstane.*—Add 3 g. of 3,17-bis-oximino androstane to a solution of 0.25 g. of sodium in 50 ml. of anhydrous ethanol at room temperature. Stir for approximately 15 minutes at room temperature; then add a solution of 2 g. of β-dimethylaminoethyl chloride in 10 ml. of ethanol. Reflux with stirring for 4 hours; then distill the ethanol in vacuo on a steam bath. Add water to the resultant residue and extract with ether. Combine the ether extracts and extract with dilute aqueous hydrochloric acid. To the combined hydrochloric aicd solution add ammonium hydroxide until basic; then extract with methylene chloride. Evaporate the methylene chloride in vacuo from the combined extracts and recrystallize the resultant residue from methylene chloride-hexane to give 3,17-bis-(β-dimethylaminoethoximino)-androstane.

In a similar manner, by substituting β-diethylaminoethyl chloride for β-dimethylaminoethyl chloride in the above procedure there is obtained 3,17-bis-(β-diethylaminoethoximino)-androstane.

In a similar manner, 3,17-bis-oximino-4-androstene, 3,17-bis-oximino-4-androstene-11β-ol, and 3,11,17-tri-oximino-4-androstene are each reacted with sodium ethylate followed by β-dimethylaminoethyl chloride in a manner similar to that described above and the resultant products isolated and purified in the described manner to give, respectively,
3,-17-bis-(β-dimethylaminoethoximino)-4-androstene,
3,17-bis-(β-dimethylaminoethoximino)-4-androstene-
   11β-ol,
and 3,11,17-tri-(β-dimethylaminoethoximino)-4-
   androstene.

*Example 3.—17-(β-dimethylaminoethoximino)-androstane-3-one*

A. *3 - ethylenedioxy-17-(β-dimethylaminoethoximino)-androstane.*—In a manner similar to that described in example 1A, allow 3-ethylenedioxyandrostane-17-one to react with O-β-dimethylaminoethylhydroxylamine dihydrochloride. Isolate and purify the resultant product in the manner described to give 3-ethylenedioxy-17-(β-dimethylaminoethoximino)-androstane.

Similarly, 3-ethylenedioxy-5-androstene-17-one, 17-ethylenedioxy-4-androstene-3-one, and 17-ethylenedioxy-1,4-androstadiene-3-one are each reacted with O-β-dimethylaminoethylhydroxylamine dihydrochloride and the resultant products isolated and purified to give, respectively,
3-ethylenedioxy-17-(β-dimethylaminoethoximino)-5-
   androstene,
3-(β-dimethylaminoethoximino)-17-ethylenedioxy-4-
   androstene, and
3-(β-dimethylaminoethoximino)-17-ethylenedioxy-1,4-
   androstadiene.

B. *17 - (β - dimethylaminoethoximino)-androstane-3-one.*—Add 2 g. of 3-ethylenedioxy-17-(β-dimethylaminoethoximino)-androstane to 30 ml. of 90% aqueous acetic acid and heat the solution on a steam bath for 30 minutes. Add 100 ml. of water and filter, wash with water, and dry the resultant precipitate of substantially 17-(β-dimethylaminoethoximino)-androstane-3-one. Purify by crystallization from hexane.

In a similar manner, treat each of 3-ethylenedioxy-17-(β-dimethylaminoethoximino)-5-
   androstene,
3-(β-dimethylaminoethoximino)-17-ethylenedioxy-4-
   androstene, and
3-(β-dimethylaminoethoximino)-17-ethylenedioxy-1,4-
   androstadiene with 90% aqueous acetic acid in the above-described manner whereby is obtained, respectively, 17-(β-dimethylaminoethoximino)-4-androstene-3-one,
3-(β-dimethylaminoethoximino)-4-androstene-17-one, and
3-(β-dimethylaminoethoximino)-1,4-androstadiene-17-
   one.

*Example 4.—17-(β-benzyl-methylaminoethoximino)-androstane-3α-ol*

In a manner similar to that described in Example 1, treat androstane-3α-ol-17-one with O-β-benzyl-methylaminoethylhydroxylamine dihydrochloride in pyridine and ethanol and isolate and purify the resultant product in a manner similar to that described to give 17-(β-benzyl-methylaminoethoximino)-androstane-3α-ol.

Similarly, 5-androstene-3β-ol-17-one and 4-androstene-17β-ol-3-one are each reacted with O-β-benzyl-methylaminoethylhydroxylamine dihydrochloride in the above-described manner to give, respectively, 17-(β-benzyl-methylaminoethoximino) - 5-androstene-3β-ol and 3-(β-benzyl-methylaminoethoximino)-4-androstene-17β-ol.

*Example 5.—3-(β-dimethylaminoethoximino)-androstane-17-one*

Heat a solution of 1.9 g. of 3-(β-dimethylaminoethoximino)-androstane-17β-ol in 200 ml. of toluene and 200 g. of cyclohexanone and distill about 50 ml. of toluene; then add dropwise over a period of one-half hour a solution of 3 g. of aluminum iso-propylate in 100 ml. of toluene. Continue the distillation for an additional one-half hour. Cool the reaction mixture; then extract with dilute hydrochloric acid. And sodium hydroxide to the combined acid extracts until the solution is basic; then extract with methylene chloride. Distill the solvent in vacuo from the combined methylene chloride extracts to a residue substantially of 3-(β-dimethylaminoethoximino) androstane-17-one. Purify by crystallization from hexane.

*Example 6.—Hydrochloride salts of androstane oximino ether derivatives*

A. *17-(β-dimethylaminoethoximino)-androstane-3α-ol hydrochloride.*—To a solution of 2.7 g. of 17-(β-dimethylaminoethoximino)-androstane-3α-ol dissolved in 350 ml. of dry ether, add a saturated alcoholic solution of hydrogen chloride until precipitation is complete. Filter the resultant precipitate of 17-(β-dimethylaminoethoximino)-androstane-3α-ol hydrochloride. Purify by recrystallization from ethanol-ether. M.P. 245–246° C.

B. In a manner similar to that described in Example 6A, add a saturated alcoholic solution of hydrogen chloride to an ethereal solution of each of the oximino ethers prepared in preceding Examples 1–5 and there is obtained the corresponding hydrochloride acid salts, i.e.:

17-(β-dimethylaminoethoximino)-androstane-3α-ol hydrochloride
3α-acetoxy-17-(β-dimethylaminoethoximino)-androstane hydrochloride
17-(β-diethylaminoethoximino)-androstane-3α-ol hydrochloride
17-(ω-diethylaminopentoximino)-androstane-3α-ol hydrochloride
17-(ω-dimethylaminopropoximino)-androstane-3α-ol hydrochloride
17-(β-dimethylaminoethoximino)-androstane-3β-ol hydrochloride
3-(β-dimethylaminoethoximino)-androstane-17β-ol hydrochloride
3-(β-dimethylaminoethoximino)-androstane-17β-ol valerate hydrochloride
17-(β-dimethylaminoethoximino)-5-androstene-3β-ol hydrochloride
17-(β-dimethylaminoethoximino)-5-androstene-3β-ol acetate hydrochloride
3-(β-dimethylaminoethoximino)-4-androstene-17β-ol hydrochloride
3-(β-dimethylaminoethoximino)-4-androstene-17β-ol propionate hydrochloride
3-(β-dimethylaminoethoximino)-17α-methyl-4-androstene-17β-ol hydrochloride
3-(β-dimethylaminoethoximino)-17α-ethinyl-19-nor-4-androstene-17β-ol hydrochloride
3-(β-dimethylaminoethoximino)-17α-ethinyl-4-androstene-17β-ol hydrochloride
3-(β-dimethylaminoethoximino)-1,4-androstadiene-17β-ol hydrochloride
3-(β-dimethylaminoethoximino)-9α-fluoro-17α-methyl-4-androstene-11β,17β-diol hydrochloride
3-(β-dimethylaminoethoximino)-16α-methylandrostane-17β-ol-11-one hydrochloride
3-(β-dimethylaminoethoximino)-6α-methyl-9α,11β-dichloroandrostane-17β-ol hydrochloride
3-(β-dimethylaminoethoximino)-5α-9(11)-androstene-17β-ol propionate hydrochloride
3-(β-dimethylaminoethoximino)-6β-bromo-9β,11β-oxido-17α-ethinyl-1,4-androstadiene-17β-ol hydrochloride
3-(β-dimethylaminoethoximino)-6α-fluoro-4-androstene-17β-ol hydrochloride
3,17-bis-(β-dimethylaminoethoximino)-androstane dihydrochloride
3,17-bis-(β-diethylaminoethoximino)-androstane dihydrochloride
3,17-bis-(β-dimethylaminoethoximino)-4-androstene dihydrochloride
3,17-bis-(β-dimethylaminoethoximino)-4-androstene-11β-ol dihydrochloride
3,11,17-tri-(β-dimethylaminoethoximino)-4-androstene dihydrochloride
17-(β-dimethylaminoethoximino)-androstane-3-one hydrochloride
17-(β-dimethylaminoethoximino)-4-androstene-3-one hydrochloride
3-(β-dimethylaminoethoximino)-4-androstene-17-one hydrochloride
3-(β-dimethylaminoethoximino)-1,4-androstadiene-17-one hydrochloride
17-(β-benzyl-methylaminoethoximino)-androstane-3α-ol hydrochloride
17-(β-benzyl-methylaminoethoximino)-5-androstene-3β-ol hydrochloride
3-(β-benzyl-methylaminoethoximino)-4-androstene-17β-ol hydrochloride
3-(β-dimethylaminoethoximino)-androstane-17-one hydrochloride.

*Example 7.—(Trialkylammoniumalkoximino)-androstane iodides*

A. *17-(β-trimethylammoniumethoximino)-androstane-3α-ol.*—To a solution of 2 g. of 17-(β-dimethylaminoethoximino)-androstane-3α-ol in anhydrous ether add 2 g. of methyl iodide and allow the mixture to stand for several hours. Filter off the resultant product of 17-(β-trimethylammoniumethoximino)-androstane-3α-ol iodide. Purify by crystallization from ethanol-ether.

B. In a similar manner, each of the oximino ethers prepared in Examples 1–5 is treated with methyl iodide-ether to obtain the respective quaternary ammonium salts thereof, i.e.:

3α-acetoxy-17-(β-trimethylammoniumethoximino)-androstane iodide
17-(β-methyl-diethylammoniumethoximino)-androstane-3α-ol iodide
17-(ω-methyl-diethylammoniumpentoximino)-androstane-3α-ol iodide
17-(ω-trimethylammoniumpropoximino)-androstane-3α-ol iodide
17-(β-trimethylammoniumethoximino)-androstane-3β-ol iodide
3-(β-trimethylammoniumethoximino)-androstane-17β-ol iodide
3-(β-trimethylammoniumethoximino)-androstane-17β-ol valerate iodide
17-(β-trimethylammoniumethoximino)-5-androstene-3β-ol iodide
17-(β-trimethylammoniumethoximino)-5-androstene-3β-ol acetate iodide
3-(β-trimethylammoniumethoximino)-4-androstene-17β-ol iodide
3-(β-trimethylammoniumethoximino)-4-androstene-17β-ol propionate iodide
3-(β-trimethylammoniumethoximino)-17α-methyl-4-androstene-17β-ol iodide
3-(β-trimethylammoniumethoximino)-17α-ethinyl-19-nor-4-androstene-17β-ol iodide
3-(β-trimethylammoniumethoximino)-17α-ethinyl-4-androstene-17β-ol iodide
3-(β-trimethylammoniumethoximino)-1,4-androstadiene-17β-ol iodide
3-(β-trimethylammoniumethoximino)-9α-fluoro-17α-methyl-4-androstene-11β,17β-diol iodide
3-(β-trimethylammoniumethoximino)-16α-methyl-androstane-17β-ol-11-one iodide
3-(β-trimethylammoniumethoximino)-6α-methyl-9α,11β-dichloroandrostane-17β-ol iodide
3-(β-trimethylammoniumethoximino)-5α-9(11)-androstene-17β-ol propionate iodide
3-(β-trimethylammoniumethoximino)-6β,bromo-9β,11β-oxido-17α-ethinyl-1,4-androstadiene-17β-ol iodide
3-(β-trimethylammoniumethoximino)-6α-fluoro-4-androstene-17β-ol iodide
3,17-bis-(β-trimethylammoniumethoximino)-androstane di-iodide
3,17-bis-(β-methyl-diethylammoniumethoximino)-androstane di-iodide
3,17-bis-(β-trimethylammoniumethoximino)-androstene di-iodide 3,17-bis-(β-trimethylammoniumethoximino)-4-androstene-11β-ol di-iodide
3,11,17-tri-(β-trimethylammoniumethoximino)-4-androstene di-iodide
17-(β-trimethylammoniumethoximino)-androstane-3-one iodide
17-(β-trimethylammoniumethoximino)-4-androstene-3-one iodide
3-(β-trimethylammoniumethoximino)-4-androstene-17-one iodide
3-(β-trimethylammoniumethoximino)-1,4-androstadiene-17-one iodide
17-(β-benzyl-dimethylammoniumethoximino)-androstane-3α-ol iodide
17-(β-benzyl-dimethylammoniumethoximino)-5-androstene-3β-ol iodide
3-(β-benzyl-dimethylammoniumethoximino)-4-androstene-17β-ol iodide
3-(β-trimethylammoniumethoximino)-androstane-17-one iodide.

*Example 8.—17 - (β - dimethylaminoethoximino)-androstane-3α-ol maleate, 17-(β-dimethylaminoethoximino)-androstane-3α-ol tartrate*

To an ethereal solution of 17-(β-dimethylaminoethoximino)-androstane-3α-ol add a molar equivalent of maleic acid in ether. Filter the resultant maleate salt which separates and purify by crystallization from iso-propyl acetate to give 17-(β-dimethylaminoethoximino)-androstane-3α-ol maleate.

In a similar manner, to an ethereal solution of 17-(β-dimethylaminoethoximino)-androstane-3α-ol add a molar equivalent of tartaric acid in ether to obtain 17-(β-dimethylaminoethoximino)-androstane-3α-ol tartrate.

Similarly, to an ethereal solution of 3-(β-dimethylaminoethoximino)-4-androstene-17β-ol add a molar equivalent of maleic acid in ether and isolate and purify the resultant product thereby formed to give 3-(β-dimethylaminoethoximino) - 4 - androstene-17β-ol maleate. By adding a molar equivalent of tartaric acid to an ethereal solution of 3-(β-dimethylaminoethoximino)-4-androstene-17β-ol there is obtained the respective tartrate salt, i.e., 3-(β-dimethylaminoethoximino)-4-androstene-17β-ol tartrate.

*Example 9.—17-(t-aminoalkoximino)-androstane-3α-ols*

In a manner similar to that described in Example 1, treat androstane-3α-ol-17-one with dimethylaminopropoxyamine dihydrochloride (O-β-dimethylaminopropyl-hydroxylamine dihydrochloride) in pyridine and ethanol. Isolate and purify the resultant product in a manner similar to that described to give 17-(γ-dimethylaminopropoximino)-androstane-3α-ol.

In a similar manner, androstane-3α-ol-17-one is treated with each of piperidinoethoxyamine, pyrrolidinopropoxyamine, and morpholinopropoxyamine whereby there is obtained, respectively, 17-(β-piperidinoethoximino)-androstane-3α-ol,
17-(γ-pyrrolidinopropoximino)-androstane-3α-ol, and
17-(γ-morpholinopropoximino)-androstane-3α-ol.

I claim:
1. A steroid selected from the group consisting of androstane oximino ethers of the following Formulae I, II, and III:

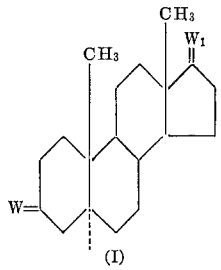

(I)

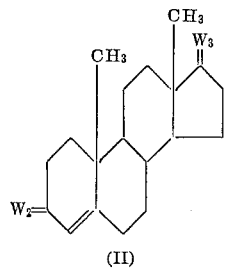

(II)

and

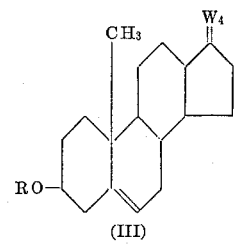

(III)

wherein R is a member selected from the group consisting of hydrogen and an acyl radical of a hydrocarbon carboxylic acid having up to 8 carbon atoms; $W_4$ is a dilower alkylaminoalkoximino; W is a member selected from the group consisting of dilower alkylaminoalkoximino, keto,

and

R being as defined hereinabove; $W_1$ is a member selected from the group consisting of dilower alkylaminoalkoximino, keto and

R being as defined hereinabove, at least one of W and $W_1$ being dilower alkylaminoalkoximino; $W_2$ is a member selected from the group consisting of keto and dilower alkylaminoalkoximino; $W_3$ being a member selected from the group consisting of keto and dilower alkylaminoalkoximino, and

R being as heretofore defined and B being a member selected from the group consisting of hydrogen, lower alkyl and ethinyl; and at least one of $W_2$ and $W_3$ being a dilower alkylaminoalkoximino; and the non-toxic, pharmaceutically acceptable acid addition salts and quaternary lower alkyl ammonium salts thereof.

2. 17-(β-dimethylaminoethoximino)-androstane-3β-ol.
3. 17 - (β - dimethylaminoethoximino) - 5-androstene-3β-ol.
4. 3 - (β - trimethylammoniumethoximino) - 4 - androstene-17β-ol iodide.
5. 3 - (β - dimethylaminoethoximino) - 4 - androstene-17β-ol.
6. 17 - (β - diethylaminoethoximino)-androstane-3α-ol hydrochloride.
7. 17 - (β - dimethylaminoethoximino)-androstane-3α-ol hydrochloride.
8. 17 - (β - dimethylaminoethoximino) - 5-androstene-3β-ol 3-acetate.
9. 3 - (β - dimethylaminoethoximino) - 17α-ethinyl-19-nor-4-androstene-17β-ol.

References Cited by the Examiner

UNITED STATES PATENTS

| | | | |
|---|---|---|---|
| 2,863,885 | 12/1958 | Babcock | 260—397 |
| 3,000,910 | 9/1961 | Birkenmeyer | 260—397 |
| 3,173,932 | 3/1965 | Littell et al. | 260—297.4 |
| 3,211,756 | 10/1965 | Mazur | 260—397.1 |

OTHER REFERENCES

Fieser and Fieser, Advanced Org. Chemistry, 1961, page 306.

LEWIS GOTTS, *Primary Examiner.*